United States Patent
Scribner

[15] 3,673,179
[45] June 27, 1972

[54] C-21 LOWER ALKYLSULFINYL ESTERS OF CERTAIN 21-HYDROXYCORTICOSTEROIDS

[72] Inventor: Richard M. Scribner, Wilmington, Del.
[73] Assignee: E. I. du Pont de Nemours and Company, Wilmington, Del.
[22] Filed: April 22, 1970
[21] Appl. No.: 31,003

[52] U.S. Cl..................260/239.55, 260/239.5, 260/397.45, 195/51
[51] Int. Cl.......................................C07c 169/32
[58] Field of Search...........................260/397.45; Machine Searched Steroids Primary Examiner—Elbert L. Roberts
Attorney—James H. Ryan

[57] ABSTRACT

C-21 Lower alkylsulfinyl esters of certain 21-hydroxycorticosteroids are good antiinflammatory agents which have both topical and systemic activities. These compounds are best prepared by a 2-step process which involves the esterification of a 21-hydroxycorticosteroid with a lower alkylsulfide-acid and oxidation of the resulting sulfide ester with a mild oxidizing agent to the corresponding sulfinyl ester.

9 Claims, No Drawings

3,673,179

C-21 LOWER ALKYLSULFINYL ESTERS OF CERTAIN 21-HYDROXYCORTICOSTEROIDS

BACKGROUND OF THE INVENTION

1. Field of the Invention

This invention is directed to lower alkylsulfinyl esters of certain 21-hydroxycorticosteroids.

2. Prior Art

Many natural or synthetic corticosteroids have valuable antiinflammatory properties and are useful as topical and systemic antiinflammatory agents. However, it is generally recognized that a need exists for antiinflammatory agents which show yet greater efficacy and/or diminished side effects.

The potent skin-penetrating properties of dimethyl sulfoxide (DMSO) have been recognized during the past few years, and this substance has been used experimentally as a solvent to enhance skin penetration of a number of biologically active materials. The great penetration of DMSO through the skin is probably related to the dipolar character of the sulfoxide group and its hydrophilic character. DMSO, however, is not a practical solvent for drugs, because it sometimes has undesirable side effects and causes skin irritation when applied in large amounts. Chemical modification of a biologically active material by increasing its polar character and/or hydrophilic properties would appear to offer a good possibility of improving its penetration through the skin or gastrointestinal tract while at the same time favorably altering its distribution between the aqueous and liquid phases of the body. However, this approach often fails because the chemical modification alters the biological properties of the material and makes it unsuitable for the intended use.

There have been in the past no reported attempts either to increase the penetration, potency, or duration of activity or to reduce the side effects of corticosteroid compounds useful as antiinflammatory agents by exterifying a steroid alcohol with an alkylsulfinylcarboxylic acid.

SUMMARY OF THE INVENTION

According to this invention, it has now been discovered that lower alkylsulfinyl esters of certain 21-hydroxycorticosteroids have good antiinflammatory activity and are suitable for both topical and systemic use.

Although the term "corticosteroid" is well known to the art, it has been variously used to designate the origin, the chemical structure, or the biological activity of certain steroids. The compounds contemplated by the present invention are C-21 esters of 21-hydroxy-20-ketopregnane derivatives which have the characteristic $\Delta^1$-3-keto structure and preferably an oxygenated functional group at C-11. Other substituents, especially lower alkyl, hydroxyl, and halogen, can be present, as shown below.

The compounds of the present invention can be represented by the following Formula 1, in which the methyl groups at C-10 and C-13 are indicated by vertical lines.

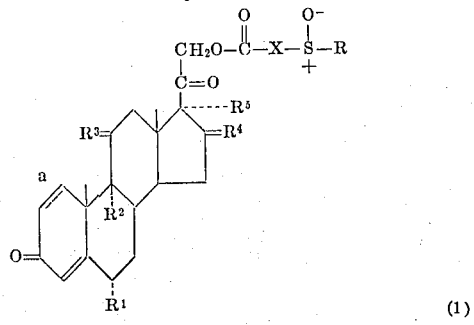

(1)

in which $a$ is a single bond or a double bond; $R^1$ is hydrogen or methyl; $R^2$ is hydrogen, chlorine, or fluorine; $R^3$ is oxygen, one $\alpha$-hydrogen and one $\beta$-hydroxyl, or one $\alpha$-hydrogen and one $\beta$-chlorine; $R^4$ is two hydrogens, one hydrogen and one methyl, one hydrogen and one hydroxyl, one hydrogen and one acetoxyl, or methylene; $R^5$ is hydroxyl; $R^4$ and $R^5$ together can form the group

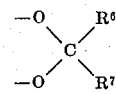

in which each of $R^6$ and $R^7$ can independently be an alkyl of one to six carbon atoms, a cycloalkyl of five to six carbon atoms, or phenyl; or $R^6$ and $R^7$ together are an alkylene of four to five carbon atoms; X is a divalent hydrocarbon radical of up to 10 carbon atoms; and R is an alkyl of one to four carbon atoms.

X and R together can form a cyclic structure, e.g., as shown in Formula 2, below, showing the D ring.

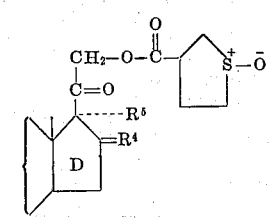

(2)

The new esters of the present invention are most conveniently prepared by a 2-step process involving the esterification of the C-21 hydroxyl with the appropriate sulfide-acid, followed by mild oxidation of the sulfide to the sulfoxide.

DETAILED DESCRIPTION OF THE INVENTION

Representative starting 21-hydroxycorticosteroids which can be converted to their 21-alkylsulfinyl esters include those listed in Table I, below.

TABLE I

17$\alpha$,21-dihydroxy-4-pregnene-3,11,20-trione (cortisone);
11$\beta$,17$\alpha$,21-trihydroxy-4-pregnene-3,20-dione (cortisol);
21-hydroxy-4-pregnene-3,11,20-trione;
9$\alpha$-fluoro-17$\alpha$,21-dihydroxy-4-pregnene-3,11,20-trione;
9$\alpha$-fluoro-11$\beta$,17$\alpha$,21-trihydroxy-4-pregnene-3,20-dione;
9$\alpha$-fluoro-17$\alpha$,21-dihydroxy-1,4-pregnadiene-3,11,20-trione;
9$\alpha$-fluoro-11$\beta$,17$\alpha$,21-trihydroxy-1,4-pregnadiene-3,20-dione;
9$\alpha$-fluoro-16$\alpha$-methyl-11$\beta$,17$\alpha$,21-trihydroxy-4-pregnene-3,20-dione;
9$\alpha$-fluoro-16$\alpha$-methyl-11$\beta$,17$\alpha$,21-trihydroxy-1,4-pregnadiene-3,20-dione;
9$\alpha$-fluoro-16$\alpha$-methyl-17$\alpha$,21-dihydroxy-1,4-pregnadiene-3,11,20-trione;
9$\alpha$-fluoro-16$\alpha$-methyl-11$\beta$,17$\alpha$,21-trihydroxy-1,4-pregnadiene-3,20-dione;
9$\alpha$-fluoro-6$\alpha$-methyl-11$\beta$,17$\alpha$,21-trihydroxy-1,4-pregnadiene-3,20-dione;
9$\alpha$-fluoro-6$\alpha$-methyl-11$\beta$,17$\alpha$,21-trihydroxy-4-pregnene-3,20-dione;
6$\alpha$-methyl-17$\alpha$,21-dihydroxy-4-pregnene-3,11,20-trione;
6$\alpha$-methyl-11$\beta$,17$\alpha$,21-trihydroxy-1,4-pregnadiene-3,20-dione;
11$\beta$,16$\alpha$,17$\alpha$,21-tetrahydroxy-1,4-pregnadiene-3,20-dione;
11$\beta$,16$\alpha$,17$\alpha$,21-tetrahydroxy-1,4-pregnadiene-3,20-dione 16,17-acetonide;
9$\alpha$-fluoro-11$\beta$,16$\alpha$,17$\alpha$,21-tetrahydroxy-1,4-pregnadiene-3,20-dione;
9$\alpha$-fluoro-11$\beta$,17$\alpha$,17$\alpha$,21-tetrahydroxy-1,4-pregnadiene-3,20-dione 16,17-acetonide;
9$\alpha$-fluoro-11$\beta$,16$\alpha$,17$\alpha$,21-tetrahydroxy-1,4-pregnadiene-3,20-dione 16,17-phenylacetonide;
9$\alpha$-fluoro-11$\beta$,16$\alpha$,17$\alpha$,21-tetrahydroxy-1,4-pregnadiene-3,20-dione 16,17-cyclohexanonide;
9$\alpha$,11$\beta$-dichloro-17$\alpha$,21-dihydroxy-4-pregnene-3,20-dione 9α,11β-dichloro-17α,21-dihydroxy-1,4-pregnadiene-3,20-dione;
21-hydroxy-17α-acetoxy-1,4-pregnadiene-3,11,20-trione;
11β,21-dihydroxy-17α-acetoxy-4-pregnene-3,20-dione;
9α-fluoro-21-hydroxy-17α-acetoxy-4-pregnene-3,11,20-trione; and
9α-fluoro-6α-methyl-11β,21-dihydroxy-17α-acetoxy-4-pregnene-3,20-dione.

Most of the above and similar starting materials are known, and many are commercially available.

Other corticosteroids which have not been previously reported or are not readily available can be made by methods known to skilled chemists having understanding of steroid reactions. Virtually all of the corticosteroid compounds comprised within the scope of the present invention can be made by several alternative routes. The choice will depend on the starting materials available as well as on the overall economics. Certain syntheses can involve the use of both chemical and microbiological techniques. Thus, the 11α-hydroxy group often can be introduced through a technique using the microorganism *Curvularia lunata*.

While Table I shows some possible corticosteroids in the form of their 16,17-acetonide, phenylacetonide, or cyclohexanonide derivatives, other ketal derivatives also can be used. In these compounds, each of $R^6$ and $R^7$ can be any one of the following representative radicals: methyl, ethyl, propyl, isopropyl, butyl, pentyl, hexyl, cyclopentyl, cyclohexyl, or phenyl; and $R^6$ together with $R^7$ can be tetramethylene or pentamethylene. Such ketals are readily obtained from the 16α,17β-dihydroxysteroids and appropriate ketones in the presence of an acid catalyst, such as perchloric acid.

The alkylsulfinyl acid portion of the corticosteroid ester can have a variety of possible structures. The divalent hydrocarbon radical, designated as X in Formula 1, can be alkylene, arylene, alkarylene, or aralkylene. Suitable X hydrocarbon radicals include those listed in Table II.

TABLE II methylene
ethylene
1,3-propylene
1,2-propylene
1,4-butylene
2,3-butylene
1,2-butylene
2-methyl-1,2-propylene
1,5-pentylene
2,2-dimethyl-1,3-propylene
1,6-hexylene
2,2-dimethyl-1,4-butylene
1,7-heptylene
1,10-decylene
2,2,4,4-tetramethylhexylene
p-phenylene
o-phenylene
m-phenylene
1,4-naphthylene
1,8-naphthylene
α,4-tolylene
α,3-tolylene
α,α'-1,4-xylene
and
4-ethyl-2,5-tolylene The lower alkyl radical, designated as R in Formula 1, can be methyl, ethyl, propyl, isopropyl, butyl, isobutyl, sec-butyl or t-butyl. As mentioned earlier, R and X can be joined together to form cyclic structures, some of which are shown below:

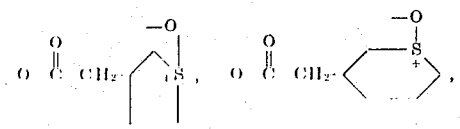

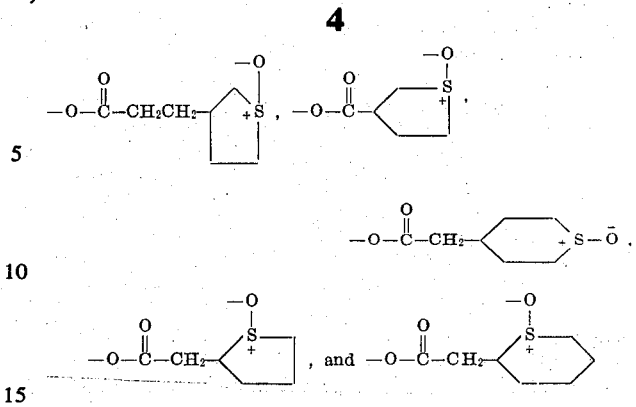

Lower alkylsulfinyl acids can be readily prepared by oxidation of the corresponding sulfide-acids with a mild oxidizing agent, such as an organic peroxyacid or hydrogen peroxide. The reaction sometimes also gives varying amounts of sulfones, which are undesirable by-products. The sulfones can be removed by several techniques, including thin layer or column chromatography, distillation, crystallization, or filtration.

It has been found, however, that esterification of a 21-hydroxycorticosteroid with either a free alkylsulfinyl acid or an alkylsulfinyl acid chloride is impractical and results at best in low yields of the desired products. Pummerer rearrangement is one of the important side reactions. The preferred process for the preparation of the novel esters of the present invention is the esterification of a 21-hydroxycorticosteroid with a sulfide-acid, followed by the oxidation of the sulfide to the sulfoxide.

Many starting sulfide-acids are readily available, but all of them can be made by conventional reactions. A simple way to make a sulfide acid involves a reaction of the sodium salt of a halogen acid with a mercaptan in alkaline medium. This and other synthetic techniques are described in Chapter 3 of "Organic Sulfur Chemistry" Vol. III, by E. E. Reid (Chemical Publishing Co., New York, 1960).

Known sulfide-acids include the following representative compounds, tabulated below. They have the formula

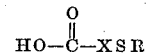

where X and R are as previously defined

TABLE III

CH₃ S CH₂ C O O H
C₂H₅ S CH₂ C O O H
C₃H₇ S CH₂ C O O H (both normal and iso)
C₄H₉ S CH₂ C O O H (normal, iso, secondary, and tertiary)
CH₃ S CH(CH₃) C O O H
C₂H₅ S CH(CH₃) C O O H
C₃H₇ S CH(CH₃) C O O H (both normal and iso)
C₄H₉ S CH(CH₃) C O O H (normal and tertiary)
CH₃ S CH(C₂H₅) C O O H
C₄H₉ S CH(C₂H₅) C O O H (normal)
C₂H₅ S C(CH₃)₂ C O O H
C₃H₇ S CH₂CH₂ C O O H (normal)
C₃H₇ S CH₂CH₂CH₂ C O O H (normal)

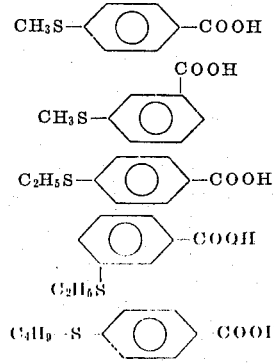

Table III—Continued and

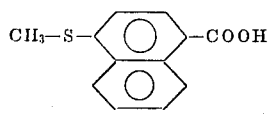

Other sulfide-acids can be prepared by the conventional synthetic methods of organic chemistry. For example, 1,5-dihydroxypentane-3-carboxylic acid, which can be prepared in several steps from diethyl malonate and ethylene oxide, can be converted to 1,5-dibromopentane-3-carboxylic acid (e.g., by treatment with triphenylphosphine dibromide and then water); this compound on treatment with sodium sulfide gives 4-thiacyclohexane-1-carboxylic acid. Thiacyclopentanecarboxylic acids can be prepared by chemical reduction or palladium catalyzed hydrogenation of the corresponding thiophenecarboxylic acids.

The first step of the process, the esterification with a sulfide-acid, is most conveniently accomplished by contacting under controlled conditions a sulfide-acid chloride with a 21-hydroxycorticosteroid. The 17α-hydroxy and the 11β-hydroxy groups are less reactive than the 21-hydroxy group and usually do not require protection. The reaction can be carried out under nitrogen at a temperature of about −30° to +30° C. in an inert solvent, such as a chlorinated hydrocarbon, or an ether. Suitable solvents include chloroform, tetrahydrofuran, or dioxane. Usually, a proton acceptor also is present in the solution. This generally is a tertiary amine, such as pyridine, triethylamine, trimethylamine, N,N-dimethylaniline, and N-methylmorpholine. Preferably, the amine itself, especially pyridine, serves as the reaction solvent and is, therefore, used in a large excess. The sulfide-acid chloride, on the other hand, preferably is used in about a stoichiometric proportion.

The acid chloride is added gradually either neat or in a solution in the same or a different inert solvent with good stirring. After addition of the acid chloride the solution is stirred for an additional period of a few hours to several days. The sulfide-acid ester is recovered by any conventional technique, such as, for example, extraction with an appropriate solvent after dilution of the reaction mixture with water. The crude ester can be purified by chromatography and/or recrystallization.

Instead of the acid chloride, the appropriate sulfide-acid anhydride or mixed anhydride can be used. The reaction usually is carried out at a temperature of about −30° to +30° C. Tertiary amines, such as pyridine, catalyze the reaction, which can also be carried out in pyridine solution. These esters can also be prepared by reaction of salts of sulfide-acids with corticoid 21-sulfonate esters.

The sulfide-acid ester formed in the first step is oxidized to the corresponding alkylsulfinyl ester by contacting the former with a mild oxidant, such as a peroxy compound, oxides of nitrogen, sodium bromate, or a periodate. Hydrogen peroxide can be used in this step, or more conveniently a peroxyacid, including perbenzoic acid, peracetic acid, or m-chloroperbenzoic acid.

In order to minimize the possibility of the formation of undesirable by-products, such as sulfoxides, the oxidation step is carried out at a low temperature, preferably within the range of −20° to 25° C., and a stoichiometric amount of the peroxy compound is used. Neighboring 16α- and 17α-hydroxy groups can be protected by the formation of an acetonide, which can later be split in a weakly acid medium if desired.

While a large number of lower alkylsulfinyl esters of 21-hydroxycorticosteroids can be made, the 2,2-dimethyl-3-methylsulfinylpropionate esters appear to offer a particularly well-balanced combination of steric hindrance toward hydrolysis and of lipophilic and hydrophilic properties. Since neither the starting 2,2-dimethyl-3-methylthiopropionyl chloride nor its precursor, 2,2-dimethyl-3-methylthiopropionic acid have been heretofore reported, their preparation is described below, in Example A. Temperatures are in degrees centigrade.

EXAMPLE A 2,2-dimethyl-3-methylthiopropionyl chloride

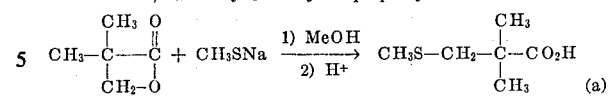

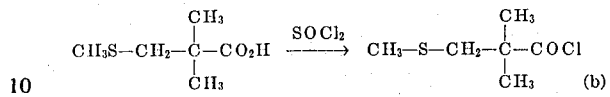

(a) Methylmercaptan, 30 g. (0.60 mole), is bubbled into a cold solution of 27 g. (0.50 mole) of sodium methoxide in 150 ml. of dry methanol. To this solution cooled in an ice bath is then added 50 g. (0.50 mole) of pivalolactone dropwise at a rate adjusted to keep the temperature of the reaction mixture at about 15°. After stirring for 1 hour at room temperature, the reaction mixture is diluted with about 300 ml. of ether and then poured into 500 ml. of ice water. The ether layer is drawn off in a separating funnel, and the aqueous layer is extracted a second time with fresh ether. The aqueous layer is then acidified with 45 ml. of conc. HCl, extracted with ether twice, and this ether extract is washed with water once, dried over $Na_2SO_4$ and evaporated in vacuo, to give a liquid which is distilled through an 18-inch spinning band column. The distillation gives 45 g. (62 percent yield) of pure 2,2-dimethyl-3-methylthiopropionic acid, b.p. 79°/0.2 mm.

Anal. Calcd. for $C_6H_{12}SO_2$:
C, 48.64; H, 8.16; S, 21.6;
Found: C, 48.48; H, 7.93; S, 21.72;

nmr ($CDCl_3$—TMSi), Hz at 60 MHz: 743 (s, 1, $CO_2H$); 165 (s, 2, S—$CH_2$—); 128 (s, 3, $CH_3S$—), 77 [s, 6, $C(CH_3)_2$]; IR ($CHCl_3$); 3.34, 3.42 (C—H), 3–4 $\mu$ ($CO_2H$), 5.85 ($CO_2H$), 7.21, 7.32 [$C(CH_3)_2$].

(b) A solution of 3-methylthio-2,2-dimethylpropionic acid in benzene is treated with excess thionyl chloride and 1 drop of dimethylformamide. After 30 min. the reaction mixture is heated at reflux temperature for 1 hr. and distilled to give 3-methyl-2,2-dimethylpropionyl chloride, b.p. about 35°/0.2 mm.

The invention is now illustrated by representative examples of certain preferred embodiments thereof. All temperatures are in degrees centigrade.

PREFERRED EMBODIMENTS

EXAMPLE 1

11β,17α,21-Trihydroxy-1,4-pregnadiene-3,20-dione 21-(2',2'-dimethyl-3'-methylsulfinylpropionate)

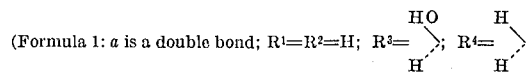

$R^5$=OH; R=$CH_3$; X=2-methyl-1,2-propylene radical)

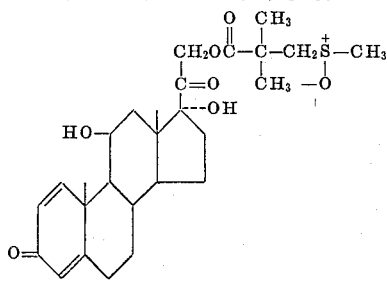

a. To a solution of 2.3 g. (64 mmoles) of 11β,17α,21-trihydroxy-1,4-pregnadiene-3,20-dione in 25 ml. of pyridine under nitrogen and cooled in an ice bath is added 1.2 g. (72 mmoles) of 2,2-dimethyl-3-methylthiopropionyl chloride from Example A. The reaction mixture is stirred with continued cooling for 1 hr. and at room temperature overnight. It is then poured into water, extracted into ethyl acetate and methylene chloride, washed with 5 percent aqueous HCl, and dried over $Na_2SO_4$. Evaporation of the organic solvent and crystallization of the residue gives pure 11β,17α,21-trihydroxy-1,4-pregnadiene-3,20-dione 21-(2',20'-dimethyl-3'-methylthiopropionate), m.p. 196°–197°(from ethanol).

Anal. Calcd. for $C_{27}H_{38}SO_6$:
C, 66.05; H, 7.81; S, 6.54;
Found: C, 66.10; H, 7.49; S, 6.31;

$\lambda_{max}$ (EtOH) 243 mµ (ε13,900), $\lambda_{max}$ (KBr) 2.90–2.95 (OH), 3.36, 3.42, 3.47 (CH), 5.77 (ester C = O), 5.83 (CO), 6.05 (conj. C = O), 6.20–6.26 (conj C = C)µ.

b. A solution of 1.627 g. (3.32 mmoles) of the methylthioester in 650 ml. of methylene chloride is cooled in an ice-salt mixture and stirred while a solution of 0.676 g. (3.32 mmoles, 85 percent assay) m-chloroperoxybenzoic acid in 60 ml. of methylene chloride is added dropwise during 45 min. The solution is stirred for 3 hrs. with continued cooling and then at room temperature overnight. The reaction mixture is extracted once with 10 ml. of saturated sodium bicarbonate solution, dried over $Na_2SO_4$, and evaporated in vacuo. Crystallization of the residue gives 11β,17α,21-trihydroxy-1,4-pregnadiene-3,20-dione 21-(2',2'-dimethyl-3'-methylsulfinylpropionate) as needles, m.p. 225°–240°(from ethanol);

Anal. Calcd. for $C_{27}H_{38}SO_7$:
C, 63.95; H, 7.56; S, 6.33;
Found: C, 64.20; H, 7.51;
S, 6.28;

$[\alpha]_D^{25} + 80°$, c = 1.03 pyridine; $\lambda_{max}$ (EtOH) 243 (ε15,100), $\lambda_{max}$ (KBr) 2.90 (OH), 3.32, 3.38, 3.44 (C—H), 5.79 and sh (ester and C—21 C = O), 6.17 and 6.22 sh (C = C), 9.87 µ (S—O); H¹ nmr ($d_5$ pyridine-TMSi) Hz at 60 MHz: 80 (s, 3, C—18 $CH_3$), 93 (s, 3, C—19 $CH_3$), 97 [s, 6, $C(CH_3)_2$], 156 (3, $CH_3SO$), 189 (2, —$SOCH_2$—), 284 (2, C—21 $CH_2$); mass spec. (70 ev) calcd: 506.2336, found: 506.2356.

EXAMPLE 2

11β17α,21-Trihydroxy-1,4-pregnadiene-3,20-dione 21-(p-methylsulfinylbenzoate)

(Formula 1: $a$ is a double bond; $R^1=R^2=H$; $R^3=\begin{smallmatrix}HO\\ \diagdown\\ H\end{smallmatrix}$; $R^4=\begin{smallmatrix}H\\ \diagdown\\ H\end{smallmatrix}$ $R^5$=OH; X is the p-phenylene radical; R=$CH_3$)

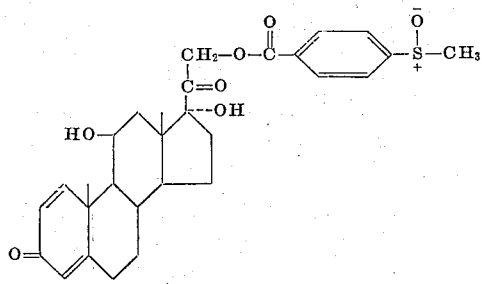

a. By a procedure analogous to Example 1, part (a), 11β,17α,21-trihydroxy-1,4-pregnadiene-3,20-dione is treated with p-methylthiobenzoyl chloride, giving the corresponding 21-(p-methylthiobenzoate) ester, m.p. 250°–253° (from ethanol).

Anal. Calcd. for $C_{29}H_{34}SO_6$:
C, 68.23; H, 6.77; S, 6.28
Found: C, 67.93; H, 6.62; S, 6.21 b. By a procedure analogous to Example 1, part (b), this ester is oxidized to 11β,17α,21-trihydroxy-1,4-pregnadiene-3,20-dione 21-(p-methylsulfinylbenzoate), m.p. 255°–258° (from ethanol). Anal.

Calcd. for $C_{29}H_{34}SO_7$: C, 66.05; H, 6.48; S, 6.08; Found: C, 66.08; H, 6.77; S, 5.86.

EXAMPLE 3

11β,17α,21-Trihydroxy-1,4-pregnadiene-3,20-dione 21(3'-methylsulfinylpropionate)

(Formula 1: $a$ is a double bond; $R^1=R^2=H$; $R^3=\begin{smallmatrix}HO\\ \diagdown\\ H\end{smallmatrix}$; $R^4=\begin{smallmatrix}H\\ \diagdown\\ H\end{smallmatrix}$;

$R^5$= OH; X is the 1,2-ethylene radical; and R is methyl)

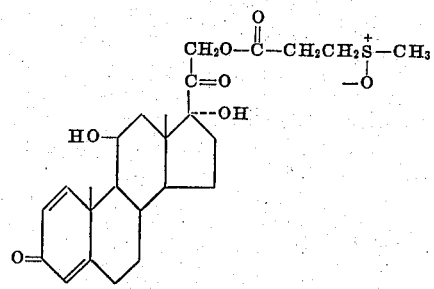

a. By a procedure analogous to Example 1, part (a) 18.0 g. of 11β,17α,21-trihydroxy-1,4-pregnadiene-3,20-dione in 130 ml. of pyridine is treated with 8.4 g. of 3-methylthiopropionyl chloride, giving the corresponding ester.

b. By a procedure analogous to Example 1, part (b) the thioester is oxidized to 11β,17α,21-trihydroxy-1,4-pregnadiene-3,20-dione 21(3'-methylsulfinylpropionate).

In like manner, any 21-hydroxycorticosteroid of Table I, above, can be contacted with an acid chloride or anhydride prepared from any sulfide-acid of Table III or from a cyclic sulfide-acid, such as 4-thiacyclohexane-1-carboxylic acid, 3-thiacyclopentane-1-carboxylic acid, 2-(4-thiacyclohexyl)-acetic acid, and 2-(3-thiacyclopentyl)acetic acid, to give the corresponding C–21 sulfide-acid ester. Each such ester can be contacted with one equivalent of a mild oxidant to give the corresponding C–21 alkylsulfinyl ester.

The esters of this invention possess useful antiinflammatory activity when administered orally, topically, or by injection. For example, the sulfoxide ester of Example I-$b$ is a potent inhibitor of carageenin-induced rat-paw edema when administered orally. Significantly, this sulfoxide ester is much more active than the corresponding sulfide ester of Example I-$a$. The biological differences between these closely related structures arise from the unusual properties of the sulfoxide linkage in the former ester. Furthermore, the sulfoxide ester of Example I-$b$ displays superior oral activity and fewer side effects than the corresponding 21-hydroxy steroid, prednisolone. This is consistent with the concept of enhanced absorption of the sulfoxide ester in the gastrointestinal tract.

Thus, prednisolone and the esters of Example I were administered orally as solutions to groups of 6 male rats. One hour after dosing, 0.05 ml. of 1 percent carrageenin solution was injected into the plantar region of the right hind paw of each rat. Foot volume was measured by displacement of mercury immediately after injection and again 3 hours later, the difference being the volume of induced edema. Urine samples were collected during the 4-hour period following dosing. The following summary of data from these experiments, presented in Table IV below shows that orally administered sulfoxide ester (Example I-$b$) is more potent than either the corresponding sulfide ester (Example I-$a$) or prednisolone with respect to edema inhibition. Furthermore, consistent with its hydrophilic character, the sulfoxide ester shows less undesirable effect on electrolyte excretion than does prednisolone.

TABLE IV

| | Edema Inhibition $ED_{50}$ mg./kg. | Dose (mg./kg.) to Increase $Na^+$ Excretion 2-Fold Over Control |
|---|---|---|
| Prednisolone | 3.5 | 4.7 |
| Sulfide Ester Example I-a | >10 | >16 |
| Sulfoxide Ester Example I-b | 0.94 | >10 |

C-21 Lower alkylsulfinyl esters of 21-hydroxycorticosteroids are useful as orally, parenterally, or topically applied antiinflammatory agents. They can be administered orally as pills, tablets, or powders (free or encapsulated), or as liquids in the form of solutions, suspensions, or syrups. Topically the esters can be administered as creams, ointments, solutions, suspensions, foams, aerosols, or powders, or from coatings on films or tapes, mixed if desired with a pharmaceutically acceptable inert vehicle or combinations of inert vehicles. Parenterally they can be injected as suspensions or solutions in pharmaceutically acceptable oils or aqueous media. Orally, topically, or parenterally the novel esters of this invention can be administered alone or in combination with pharmaceutically active agents, such as antibiotics or analgesics.

The embodiments of the invention in which an exclusive property or privilege is claimed are defined as follows:

1. An ester having antiinflammatory activity and represented by the formula

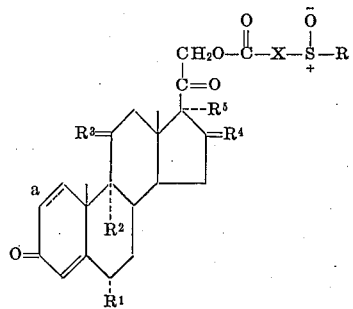

in which $a$ is either a single or a double bond;
$R^1$ is hydrogen or methyl;
$R^2$ is hydrogen, chlorine, or fluorine;
$R^3$ is oxygen, one $\alpha$-hydroxyl and one $\beta$-hydroxyl, or one $\alpha$-hydrogen and one $\beta$-chlorine;
$R^4$ is hydrogen, one hydrogen and one methyl, one hydrogen and one hydroxyl, one hydrogen and one acetoxyl, or methylene;
$R^5$ is hydroxyl; but
$R^4$ and $R^5$ together can form the group

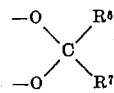

each of $R^6$ and $R^7$ is an alkyl of one to six carbon atoms;
a cycloalkyl of five to six carbon atoms, or phenyl;
or $R^6$ and $R^7$ together are an alkylene of four to five carbon atoms;
X is a divalent hydrocarbon radical of up to 10 carbon atoms; and
R is an alkyl of one to four carbon atoms;
with the proviso that X and R together can form a cyclic structure.

2. A steroid of claim 1, in which $R^4$ and $R^5$ together form the group

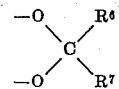

in which each of $R^6$ and $R^7$ is methyl.

3. 11$\beta$,17$\alpha$,21-Trihydroxy-1,4-pregnadiene-3,20-dione 21-(2',2'-dimethyl-3'-methylsulfinylpropionate), the compound of claim 1 in which $a$ is a double bond; $R^1$ and $R^2$ are hydrogen atoms; $R^3$ is one hydroxyl and one hydrogen; $R^4$ is two hydrogen atoms; $R^5$ is hydroxyl; X is the 2-methyl-1,2-propylene radical; and R is methyl.

4. 11$\beta$,17$\alpha$,21-Trihydroxy-1,4-pregnadiene-3,20-dione 21-(p-methylsulfinylbenzoate), the compound of claim 1 in which $a$ is a double bond; $R^1$ and $R^2$ are hydrogen atoms; $R^3$ is one hydroxyl and one hydrogen; $R^4$ is two hydrogen atoms; $R^5$ is hydroxyl; X is the p-phenylene radical; and R is methyl.

5. 11$\beta$,17$\alpha$,21-Trihydroxy-1,4-pregnadiene-3,20-dione 21-(3'-methylsulfinylpropionate), the compound of claim 1 in which $a$ is a double bond; $R^1$ and $R^2$ are hydrogen atoms; $R^3$ is one hydroxyl and one hydrogen; $R^4$ is two hydrogen atoms; $R^5$ is hydroxyl; X is the 1,2-ethylene radical; and R is methyl.

6. A process for preparing an ester of claim 1 consisting in:
   a. contacting a 21-hydroxy-20-ketopregnane with a chloride or anhydride of a sulfide-acid of the formula

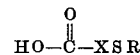

wherein X and R are as defined in claim 1 at a temperature of about −30 to +30° C. to produce a C-21 sulfide-acid ester; and
   b. oxidizing the said C-21 sulfide-acid ester by contacting it at a temperature of −20° to 25° C. with a mild oxidant of the group: oxides of nitrogen, hydrogen peroxide, a carboxylic peroxy acid, sodium bromate and sodium periodate.

7. The process of claim 6 in which step (a) is carried out with a sulfide-acid chloride in the presence of a tertiary amine at a temperature of about −30° to +10° C.

8. The process of claim 7 in which the tertiary amine is pyridine.

9. The process of claim 7 in which the step (b) is carried out with m-chloroperbenzoic acid as the oxidizing agent.

* * * * *